United States Patent
Bredt et al.

(10) Patent No.: US 9,856,390 B2
(45) Date of Patent: Jan. 2, 2018

(54) BINDER, ADHESIVE AND ACTIVE FILLER SYSTEM FOR THREE-DIMENSIONAL PRINTING OF CERAMICS

(71) Applicant: 3Dbotics, Inc., Dearborn, MI (US)

(72) Inventors: James F. Bredt, Watertown, MA (US); Katie R. Passino, Boston, MA (US)

(73) Assignee: 3Dbotics, Inc., Dearborn, MI (US)

( * ) Notice: Subject to any disclaimer, the term of this patent is extended or adjusted under 35 U.S.C. 154(b) by 238 days.

(21) Appl. No.: 14/704,455

(22) Filed: May 5, 2015

(65) Prior Publication Data

US 2015/0315399 A1    Nov. 5, 2015

Related U.S. Application Data (60) Provisional application No. 61/988,644, filed on May 5, 2014.

(51) Int. Cl.
| | |
|---|---|
| *B33Y 10/00* | (2015.01) |
| *B33Y 70/00* | (2015.01) |
| *B29C 64/165* | (2017.01) |
| *B28B 1/00* | (2006.01) |
| *C04B 35/636* | (2006.01) |
| *C04B 35/634* | (2006.01) |
| *C04B 111/00* | (2006.01) |
| *C04B 26/28* | (2006.01) |
| *C09D 101/28* | (2006.01) |
| *C04B 35/04* | (2006.01) |
| *C04B 35/622* | (2006.01) |
| *C04B 35/63* | (2006.01) |

(52) U.S. Cl.
CPC ........ *C09D 101/284* (2013.01); *B29C 64/165* (2017.08); *B33Y 10/00* (2014.12); *B33Y 70/00* (2014.12); *C04B 26/28* (2013.01); *C04B 35/04* (2013.01); *C04B 35/622* (2013.01); *C04B 35/6303* (2013.01); *C04B 35/634* (2013.01); *C04B 35/6365* (2013.01); *C04B 2111/00181* (2013.01); *C04B 2235/3206* (2013.01); *C04B 2235/447* (2013.01); *C04B 2235/449* (2013.01); *C04B 2235/5427* (2013.01); *C04B 2235/5436* (2013.01); *C04B 2235/6026* (2013.01)

(58) Field of Classification Search
None
See application file for complete search history.

(56) References Cited

U.S. PATENT DOCUMENTS

| | | | |
|---|---|---|---|
| 5,204,055 A | 4/1993 | Sachs et al. | |
| 5,807,437 A | 9/1998 | Sachs et al. | |
| 6,146,567 A | 11/2000 | Sachs et al. | |
| 6,610,429 B2 | 8/2003 | Bredt et al. | |
| 7,087,109 B2 | 8/2006 | Bredt et al. | |
| 7,332,537 B2 | 2/2008 | Bredt et al. | |
| 8,211,226 B2 | 7/2012 | Bredt et al. | |
| 2004/0056378 A1 | 3/2004 | Bredt et al. | |
| 2004/0094058 A1 | 5/2004 | Kasperchik et al. | |
| 2005/0003189 A1* | 1/2005 | Bredt ................. B29C 67/0081 428/402 |
| 2007/0241482 A1 | 10/2007 | Giller et al. | |

FOREIGN PATENT DOCUMENTS

| | | |
|---|---|---|
| EP | 1268165 A1 | 1/2003 |
| EP | 1541321 A2 | 6/2005 |
| WO | WO-2004113042 A2 | 12/2004 |
| WO | WO-2007/114895 A2 | 10/2007 |

OTHER PUBLICATIONS

International Search Report and Written Opinion in PCT/US2015/029284 dated Aug. 24, 2015 11 pages.

* cited by examiner

*Primary Examiner* — Mary Lynn F Theisen
(74) *Attorney, Agent, or Firm* — Hansen IP Law PLLC (57) ABSTRACT

A powder for three-dimensional printing including a mixture of soluble adhesive; cement filler including magnesium oxide, and acid additive; and nonreactive ceramic filler. A kit includes a substantially nonaqueous liquid jetting fluid, and a solid powder mixture including soluble adhesive, magnesium oxide, an acid additive, and a nonreactive ceramic filler. A nonaqueous liquid jetting fluid includes up to 50 wt % cosolvents, and an acidic additive. A method for forming a three dimensional article includes providing a layer of a powder mixture including a soluble adhesive, magnesium oxide, an acid additive, and a nonreactive ceramic filler; and applying a substantially nonaqueous liquid jetting fluid including less than 50% water by weight to the powder mixture layer. A solid article formed by three-dimensional printing includes a solidified combination of a powder mixture including soluble adhesive, magnesium oxide, acid additive, and nonreactive ceramic filler; and a substantially nonaqueous liquid jetting fluid.

18 Claims, 3 Drawing Sheets

BINDER, ADHESIVE AND ACTIVE FILLER SYSTEM FOR THREE-DIMENSIONAL PRINTING OF CERAMICS

RELATED APPLICATION

This application claims the benefit of priority to U.S. Provisional Application Ser. No. 61/988,644 filed May 5, 2014, which is incorporated herein by reference in its entirety.

FIELD OF THE INVENTION

Embodiments of the invention relate generally to three-dimensional printing, and particularly to materials for three-dimensional printing.

BACKGROUND

In the present state of three-dimensional printing ("3D printing"), much effort has been expended in perfecting the production of plastic and plastic-like articles for appearance models and light-duty functional prototypes. Additionally, a family of high-end laser sintering machines is capable of producing metal parts with impressive accuracy and mechanical properties.

Ceramic materials are somewhat less fully developed. Powdered-substrate 3D Printing is naturally suited for ceramics because conventional ceramic processing has always been based on powders. The use of freeform fabrication over conventional molding and forming processes offers a very attractive expansion of the range of shapes that can be produced, while dramatically reducing the time to produce a part from a CAD model.

The original invention of powdered-substrate inkjet 3D Printing at MIT in the early 1990s used a ceramic powder in combination with a ceramic slurry dispensed through a continuous-jet inkjet printhead. See, e.g., U.S. Pat. Nos. 5,204,055, 5,807,437, and 6,146,567, which are incorporated herein by reference in their entireties. This combination suffered from reliability problems due to instability of the ceramic slurries, and wear on the jetting apparatus.

Later, Z Corporation developed a set of materials using gypsum plaster reinforced with a water-soluble adhesive. See, e.g., various Z Corporation plaster patents such as U.S. Pat. Nos. 6,610,429, 7,087,109, and 7,332,537, which are incorporated herein by reference in their entireties. This approach has the advantage of moving all the chemical reagents into the powder bed, and keeping the jetting fluid water-based and as simple as possible to enhance reliability. It affords high accuracy and reliability, but limits the performance of the product to a temperature range in which gypsum is stable—up to about 1000° C. High accuracy is maintained by the gypsum because it is an 'active' filler: It chemically bonds under the action of the solvent (water) in a short period of time relative to the time to dry. This ensures that capillary stresses do not exceed the yield strength of the material, and therefore warping and other problems are avoided.

Extrude-Hone (now EX-One) and VoxelJet used Croning sand, a product bonded with furan resin and catalyzed with methanesulfonic acid (MSA), to build molds for higher-temperature metal castings. MSA was dispensed through a drop-on-demand printhead in an alcohol solution. While this material system opened up new opportunities in high-temperature metal casting, the material is not recyclable and may create a toxic waste problem. See, e.g., EP 1,268,165, which is incorporated herein by reference in its entirety.

To deal with these many problems, a team at MIT developed a powder system based on Portland cement that was recyclable and solidified with a water-based ink. See U.S. Pat. No. 8,211,226, which is incorporated herein by reference in its entirety. This material provides a reliable method to build molds for metals poured up to 1450° C., and some opportunity to go even higher. This material is accurate and reliable, though it depends on the use of foundry sand as a filler, and the fraction of cement in the mix may preclude its use as a general-purpose system for ceramics.

SUMMARY

An embodiment of the invention includes a general-purpose adhesive-cement binding system to be used in combination with a commercially significant ceramic that forms the bulk of a 3D printed component. The materials described herein permit a nonreactive ceramic powder to be formed in a 3D printer into a solid "green" article that retains its shape during handling after production, including an optional heat treatment in a kiln. Most of the binding material burns off during firing, leaving an article that is substantially comprised of the ceramic filler of choice.

A kit in accordance with embodiments of the invention includes a combination of a powdered material that may be spread in layers and a jetting fluid that may be dispensed by a printhead. The jetting fluid is substantially nonaqueous (i.e., less that 50 wt % water), and the powder is a powdered soluble adhesive including a two-component (acid-base) cement and a nonreactive ceramic filler.

In an aspect, embodiments of the invention include a powder for three-dimensional printing including a mixture of soluble adhesive; a cement filler including magnesium oxide and an acid additive, e.g., lactic acid, acetic acid, tartaric acid, ascorbic acid, adipic acid, oxalic acid, butyric acid, malonic acid, maleic acid, gluconic acid, benzoic acid, propanoic acid, phthalic acid, itaconic acid, succinic anhydride, acetic anhydride, maleic anhydride, phthalic anhydride, propanoic anhydride, monosodium glutamate, monosodium citrate, monosodium tartrate, g-butyrolactone and d-gluconolactone; and/or a nonreactive ceramic filler.

One or more of the following features may be included. The soluble adhesive may be a compound derived from starch or a compound derived from cellulose. The soluble adhesive may be, e.g., maltodextrin, hydrolyzed starch, or hydroxypropyl cellulose. The cement filler may have a grain size of less than 200 µm. The nonreactive ceramic filler may be, e.g., porcelain, a porcelain precursor, a refractory material, an abrasive material, kieserite, and magnesium sulfate monohydrate. The nonreactive ceramic filler may have a grain size of less than 300 microns.

In another aspect, embodiments of the invention include a kit suitable for three-dimensional printing including a substantially nonaqueous liquid jetting fluid including less than 50% water by weight; and a solid powder mixture including a soluble adhesive, magnesium oxide, an acid additive, and a nonreactive ceramic filler.

One or more of the following features may be included. The jetting fluid may include at least 50% propylene glycol by weight. The jetting fluid may include up to 50 wt % cosolvents including water, glycerin, an alcohol, an ester, and/or a glycol ether. The alcohol may be denatured alcohol, isopropyl alcohol, methyl alcohol, and/or ethyl alcohol. The ester may be ethyl acetate, ethyl butyrate, dimethyl succinate, propylene glycol diacetate, and/or triethyl citrate. The glycol ether may be 2-ethoxyethanol, 2-butoxy-ethoxy-ethanol, dipropylene glycol monomethyl ether, and/or diethylene glycol monomethyl ether acetate. The jetting fluid may include an acidic additive such as lactic acid, acetic acid, tartaric acid, ascorbic acid, adipic acid, sulfamic acid, oxalic acid, butyric acid, phosphoric acid, malonic acid, maleic acid, gluconic acid, benzoic acid, propanoic acid, phthalic acid, itaconic acid, succinic anhydride, acetic anhydride, maleic anhydride, phthalic anhydride, and propanoic anhydride, monosodium phosphate, monopotassium phosphate, monosodium glutamate, monosodium citrate, monosodium tartrate, g-butyrolactone, and/or d-gluconolactone.

The powder mixture may include an acid additive such as citric acid, succinic acid, malic acid, fumaric acid, tartaric acid, ascorbic acid, adipic acid, sulfamic acid, oxalic acid, malonic acid, maleic acid, gluconic acid, benzoic acid, phthalic acid, itaconic acid, succinic anhydride, maleic anhydride, and/or phthalic anhydride. The nonreactive ceramic filler may be, e.g., porcelain and porcelain precursors, refractories, abrasives, glass powder, and glass-forming minerals, kieserite, and/or magnesium sulfate monohydrate.

In yet another aspect, embodiments of the invention include a substantially nonaqueous liquid jetting fluid including up to 50 wt % cosolvents and an acidic additive.

One or more of the following features may be included. The cosolvents may include water, glycerin, an alcohol, an ester, and/or a glycol ether. The acidic additive may be lactic acid, acetic acid, tartaric acid, ascorbic acid, adipic acid, sulfamic acid, oxalic acid, butyric acid, phosphoric acid, malonic acid, maleic acid, gluconic acid, benzoic acid, propanoic acid, phthalic acid, itaconic acid, succinic anhydride, acetic anhydride, maleic anhydride, phthalic anhydride, propanoic anhydride, monosodium phosphate, monopotassium phosphate, monosodium glutamate, monosodium citrate, monosodium tartrate, g-butyrolactone and/or d-gluconolactone.

In still another aspect, embodiments of the invention include a method for forming a three dimensional article, including (i) providing a layer of a powder mixture, said powder mixture comprising a soluble adhesive, magnesium oxide, an acid additive, and a nonreactive ceramic filler; and (ii) applying a substantially nonaqueous liquid jetting fluid comprising less than 50% water by weight to at least a portion of the powder mixture layer.

In another aspect, embodiments of the invention include a solid article formed by three-dimensional printing, including a solidified combination of (i) a powder mixture including a soluble adhesive, magnesium oxide, an acid additive, and a nonreactive ceramic filler; and (ii) a substantially nonaqueous liquid jetting fluid including less than 50% water by weight.

BRIEF DESCRIPTION OF FIGURES

FIG. 2a and FIG. 2b are graphs illustrating the forces acting on a particle during three dimensional printing with FIG. 2a illustrating the wake left behind a feature of an article when build material, after being swept along the upper surface, is unable to wrap around the downstream corner.

DETAILED DESCRIPTION

The formation of a solid part by 3D Printing over a powdered substrate happens in a series of stages. In the first stage, the jetting fluid (also referred to as "binder") is dispensed on the surface of the bed of loose powder, and soaks into the pores between powder grains. Next, the fluid dissolves the soluble components of the powder. The soluble components migrate to locations where they will form bonds between grains of the nonreactive ceramic. Subsequently, the reactive components mix and react in the powder to cause some solid bonds to form between loose powder grains. This forms a scaffold that inhibits part distortion from stresses generated as the fluid evaporates. Evaporation (or diffusion) of the fluid releases the soluble components from solution and allows them to further strengthen the body of material.

The rates of migration, dissolution, reaction, and evaporation are preferably all tuned relative to each other for the final product to have optimal properties. For this reason, the chemical components are carefully selected. While many of the components used are water-reactive, it has been found that certain other solvents also support the necessary dissolution and reactions, with the benefit that the rate of capillary migration and the rate of evaporation are much different from that of water.

Embodiments of a material system in accordance with the invention include two components: the jetting fluid (also referred to as binder or ink), and a powder mixture including an adhesive, and a cement.

Jetting Fluid

Suitable jetting fluids may have the following composition:

nonaqueous solvent 50-100 wt %, preferably 60-90 wt %, most preferably 75-85 wt % additives 0-20 wt %, e.g., 1-20 wt %, preferably 1-10 wt %, most preferably 1-5 wt % cosolvent 0-50 wt %, e.g., 1-50 wt %, preferably 10-40 wt %, surfactant 0-5 wt %, e.g., 0.01-0.05 wt %, preferably 0.01-0.03 wt %, most preferably 0.02 wt % biocide 0-1 wt %, e.g., 0.1-0.5 wt %, preferably 0.2-0.4 wt % acidic additive 0-20 wt %, e.g., 1-20 wt %, preferably 5-15 wt %

The preferred nonaqueous solvent for inclusion in the jetting fluid of embodiments of the invention is propylene glycol (PG), a nontoxic organic liquid that evaporates slowly. Propylene glycol is a nonaqueous liquid that is compatible with many industrial inkjet printheads and has a sufficient solvent action to react with the adhesives and cements described below. Additionally, propylene glycol is electrically nonconductive, which expands the range of printheads that can be used.

Other additives to the jetting fluid, i.e., binder or ink, may be included to control its viscosity and surface tension, as well as promote reliable jetting, and efficient cleaning of the printhead. Further, a dye may be included in the jetting fluid to make the jetting fluid visible in the powder after printing.

To adjust the viscosity of the fluid, a number of appropriate cosolvents have been determined. These include: water (in small quantity, less than 50 wt %), glycerin, alcohols such as denatured alcohol, isopropyl alcohol, methyl alcohol, and ethyl alcohol; esters such as ethyl acetate, ethyl butyrate, dimethyl succinate, propylene glycol diacetate, and triethyl citrate; glycol ethers such as 2-ethoxy-ethanol, 2-butoxy-ethoxy-ethanol, dipropylene glycol monomethyl ether, and diethylene glycol monomethyl ether acetate. The fluid is substantially nonaqueous, including less than 50% water by weight. Propylene glycol, in the range of 50% to 100% by weight, along with one or more of the solvents listed above, preferably make up the bulk of the jetting fluid. A preferable range of composition for a cosolvent is 0-25 wt %.

Surfactants to stabilize the fluid meniscus may be added. A preferred surfactant is tetramethyl decyne diol ethoxylate (e.g., Surfynol 463 surfactant available from Air Products, Allentown, Pa.). It is typically used at a level of 0.01% to 0.05% by weight. Further, a biocide may be used to inhibit bacteria, fungus, or algae growth. Biocides may be used at a level of 1% by weight or less, most typically around 0.1-0.25 wt. %

Acidic additives may optionally be added to the propylene glycol-based jetting solution to add solids to the mixture and accelerate solidification. Materials that may be added to the jetting solution to react with cement components include lactic acid, acetic acid, tartaric acid, ascorbic acid, adipic acid, sulfamic acid, oxalic acid, butyric acid, phosphoric acid, malonic acid, maleic acid, gluconic acid, benzoic acid, propanoic acid, phthalic acid, and itaconic acid. Acid anhydrides, including succinic anhydride, acetic anhydride, maleic anhydride, phthalic anhydride, and propanoic anhydride, may also be added to the jetting solution in order to strengthen the part by adding solids that will react with cement components. Acidic salts may also be used, including monosodium phosphate, monopotassium phosphate, monosodium glutamate, monosodium citrate, and monosodium tartrate. Lactones such as g-butyrolactone and d-gluconolactone have been found to react with MgO to form a solid structure. Acidic additives may be used up to the limit of their solubility on the jetting solution. For solid solutes, this is less than 20% by weight, most typically around 5% by weight. Notable exceptions are reagents that are liquids from the list above that are miscible with propylene glycol. These can be included as cosolvents up to 50% by weight.

The preferred quantity of acidic additive in a jetting solution is one that satisfies the following two criteria. First, when the jetting fluid is mixed at a volumetric ratio of about 1/10 with 9/10 unreacted powder the material reacts and bonds into a solid mass; second, when the jetting fluid is mixed at a volumetric ratio of about 9/10 with 1/10 reacted powder, the reacted powder softens or dissolves and may be washed away. This enables the jetting fluid to be used simultaneously as a structure building component in the 3D printing process and as a cleaning solution for the printing hardware. It is preferred that the acid additive in the ink be in the range of 1% to 20%, and most preferably around 5%-10% to possess this beneficial cleaning property.

An exemplary composition for the jetting fluid is 80% propylene glycol, 19.25% water, 0.5% dye (such as FD&C Blue #1) 0.02% surfynol, and 0.23% biocide.

Powder

The granular substrate, generally referred to as 'powder' has a number of performance characteristics that are critically important to the proper functioning of the 3D printer. These are: (1) Ability to bond into a solid matrix when combined with the jetting fluid; (2) A pore structure that confines the jetting fluid to those regions directly treated by the printer and excluding the jetting fluid from migration outside those regions; (3) Ability to flow during the spreading process and form a uniform flat upper surface to receive the jetting fluid during printing; (4) Uniformity of the flow as the spreader traverses across regions with variable degrees of hardness, e.g., when the spreading mechanism passes over the interface between solid ("printed") material and loose ("unprinted") material; and (5) Ability to provide mechanical support to the printed material through all intermediate stages of the build operation.

In one embodiment of the invention, a chemical reaction between components of the jetting fluid and the powder provides characteristic (1) above. To control the other listed characteristics, it may be necessary to adjust the distribution of grain size, grain shape, and addition of minor additives such as lubricants and flow aids to the powder. Characteristic (2) is discussed at length in a Ph.D. thesis: Binder Stability and Powder\Binder Interaction in Three Dimensional Printing, James F. Bredt, 1995. http://dspace.mit.edu/handle/1721.1/10999, incorporated herein by reference in its entirety. Characteristics (3), (4), and (5) define a particular set of frictional properties. Most particularly, the powder must possess a relatively large difference between the coefficient of static friction and the coefficient of dynamic friction. This property is described in detail in Giller et al, U.S. Patent Publication No. 2007/0241482, incorporated herein by reference in its entirety.

Powder Property Ensuring Capillary Stability of Printed Features

Regarding Characteristic (2) listed above, the geometric stability of a 3D printed feature depends on the difference between two characteristic suction pressures in a powder that may be measured. In Bredt's Ph.D. thesis from 1995, most particularly in Chapters 5 and 7 and Appendix C, this pressure balance is discussed and measurements of representative powdered materials are given. One suction pressure, called the "bubble" pressure is the suction necessary to cause fluid to drain out from a fully saturated porous body. The other pressure, the "imbibition" pressure, is the suction applied by a relatively dry porous body when its saturation is just at the threshold where pore-to-pore flow becomes possible. If the bubble pressure is greater in magnitude (i.e. stronger in suction) than the imbibition pressure then 3D printed features in a body of porous powder will be geometrically stable. To restate this criterion: Dry powder adjacent to the surface of a 3D printed feature preferably does not exert suction on the fluid that exceeds the capacity of the feature to retain the jetting fluid within its boundaries.

While the balance of pressure between wet and dry powder is certainly an important feature in determining the crispness and fidelity of the 3D printing process, it does not prevent 3D printed parts from being manufactured from powders that do not satisfy the criterion given above. If the criterion listed above is not satisfied, there exists a driving force for the jetting fluid to migrate outside of the bounds of the printed regions. This can lead to a phenomenon known as capillary fingering that may degrade accuracy and makes parts more difficult to clean.

As discussed in Chapter 7 of Bredt's Ph.D. thesis, two laboratory measurements may be used to estimate the pressures described above. The first, called a "Haines" apparatus, measures the bubble pressure while the imbibition pressure may be inferred from data provided by a mercury porosimeter. A suitable mercury porosimeter is, for example, the AutoPore IV, available from Micromeritics, based in Norcross, Ga. As a practical matter, one may use the drainage pressure at 50% saturation as measured on a Haines apparatus as an approximation for the bubble pressure. A mercury porosimeter measures pore curvature as a function of saturation. To estimate the "imbibition" pressure one may take the pore curvature at 90% mercury saturation multiplied by the surface tension of the jetting fluid.

One conclusion from the above discussion is that it may not be strictly necessary for the powder to be dry so long as the amount of liquid phase added to a powder blend is less than the percolation threshold for imbibition. In many cases it has been found that effective flow aids are in liquid form. Most typically a liquid additive is incorporated to promote mechanical cohesion of the grains of powder to impart the frictional properties described above. Typically these liquid additives are present to a concentration much less than 1% of the total volume.

Frictional Properties of a Powder Mixture in 3D Printing

A further constraint on the properties of a powder blend useful in 3D printing is discussed in Giller et al, paragraphs [0207]-[0233], from 2007. By considering a small printed feature, the authors examined a balance of frictional forces that would determine whether the feature remained in place as a film a powder is spread in a thin layer above it. The force required to cause a small feature to break free from the powder below is related to the coefficient of static friction of the powder and may be measured in a conventional shear cell. The force exerted by the moving powder carried by the spreader is related to the coefficient of dynamic friction and may be measured in a powder rheometer. Briefly put, the difference between these two friction coefficients provides a criterion for discovering whether printed features will remain stable during powder spreading.

In detail, Giller describes the requisite friction coefficients as follows. The three principal methods for controlling the flow parameter in three-dimensional printers are the addition of liquid "processing aids," control of grain size distribution, and the addition of solid fillers that contribute to the frictional behavior of the build material. Giller discloses some mechanical properties of dry particulate build materials that are particularly suited for use in three-dimensional printing, especially in contrast to other formulations of similar materials for other uses that may not require special flow characteristics of the raw materials.

Figure 1:
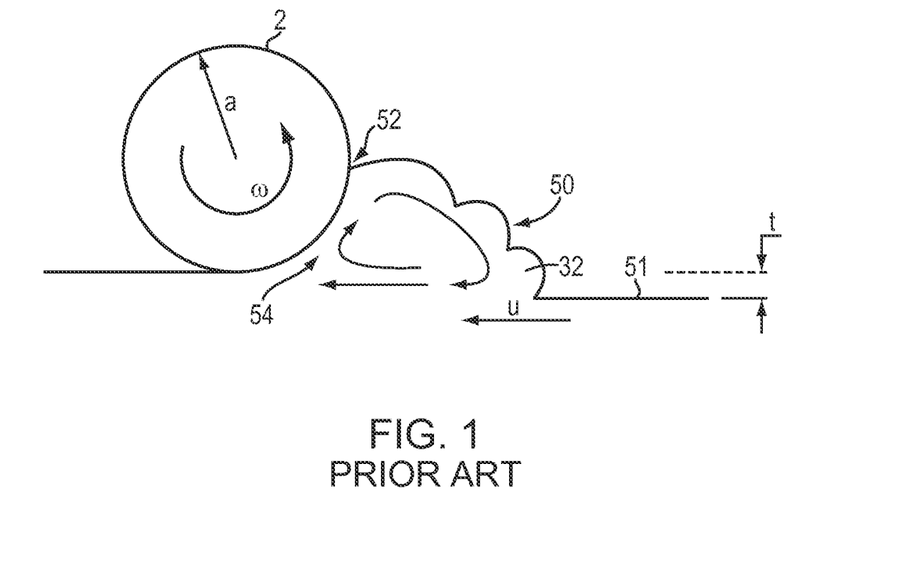
FIG. 1 is a schematic illustration of a circulating spreader bead.

Referring to FIG. 1 (FIG. 4 of Giller), in an embodiment of a three dimensional printer, dry, free-flowing particulate build material is spread by a rotating spreader rod, i.e., spreading roller 2. The rod rotates in a direction co counter to a direction of motion of the spreading mechanism. A circulating bead 50 of build material 32 is pushed in front of a moving rod over a stationary bed. For the sake of convenience, the system is shown in the frame of the rod with a moving bed 51 and stationary bead. The bed is assumed to approach the spreader in a direction u, and the bead of build material circulates around a nearly stationary center. One may assume that the build material is lifted by the leading surface of the spreader rod because it adheres to a rod surface 52. The direction of the flow of the build material reverses close to a nip 54, i.e., an interface between the spreading roller 2 and the moving bed 51.

The following analysis does not require the spreader to rotate. If it is nonrotating, the spreader can be in the form of a traveling blade with a radius on its edge contacting the powder surface. If rotating, the rod is assumed to have radius a and to rotate with angular frequency ω. If nonrotating, the blade is assumed to possess a cylindrical profile on its lower surface with radius a, but with no angular speed, i.e. ω=0. In either case, the spreader rod or blade is assumed to travel horizontally with speed u. Acceleration due to gravity is denoted by g.

Figure 2A:
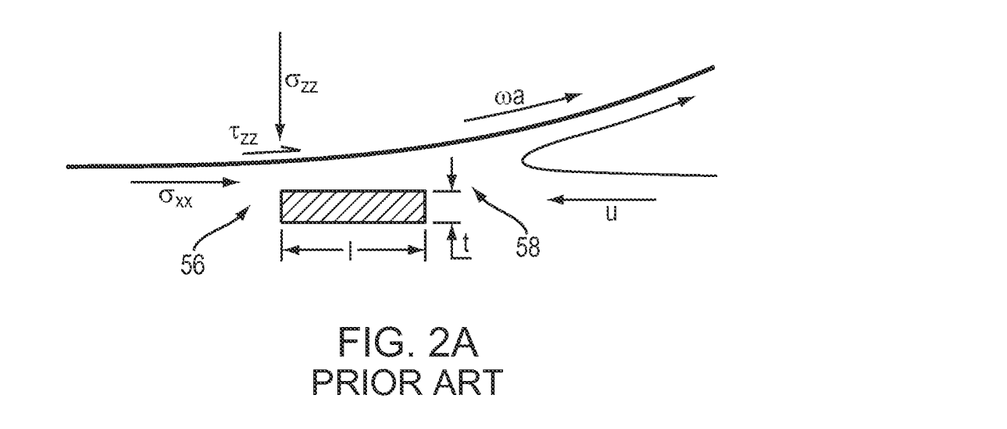
Figure 2B:
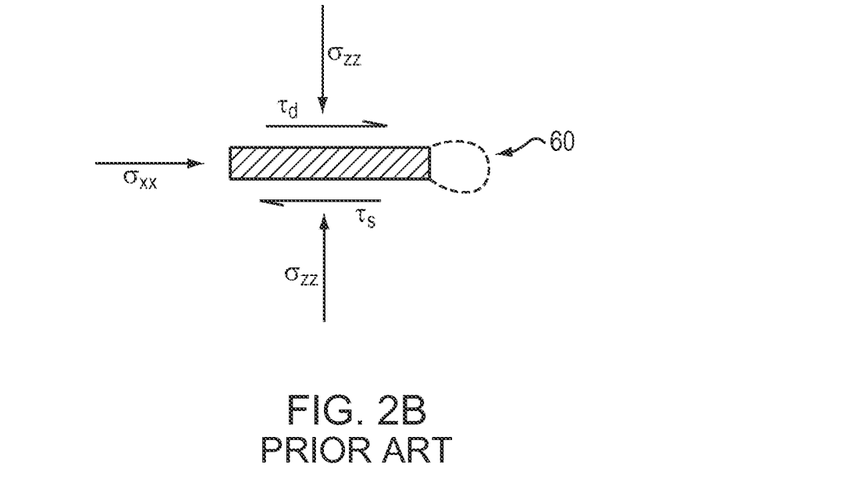
FIG. 2b includes a free body diagram of the feature, including a hollow cavity formed in the feature wake.

The equilibrium of a small printed feature as it passes directly underneath the spreader rod is analyzed. On typical 3D Printers, a thickness t of a single printed layer of build material 32 is approximately 1/100 the radius a of the spreader rod. Referring to FIGS. 2a and 2b (FIGS. 5a and 5b of Giller), the spreader exerts a compressive stress $\sigma_{zz}$ and a shear stress $\tau_{xz}$ on the build material directly underneath it. There is also a horizontal stress component $\sigma_{xx}$.

One may assume that the horizontal stress applied to a left edge of a feature 56 of an article is not opposed by another stress on a right edge. The feature is assumed to leave a wake 58 behind it where build material, after being swept along the upper surface, is unable to wrap around the downstream corner and establish a stress analogous to hydrostatic pressure against the right surface. The horizontal stress applied to the left may be opposed by a shear stress along s bottom surface. A free body diagram of the feature is shown in FIG. 2b, including a hollow cavity 60 formed in the feature wake 58.

It is assumed here that dry, free-flowing particulate build material in motion possesses a different shear strength than build material that has been allowed to rest for a time. In general, one may expect a different yield locus for build material in different states of motion. For purposes of this derivation, this is expressed here as two different sets of yield parameters, "static" and "dynamic" values of the cohesion and friction angle.

These properties of granular materials are amply supported in the literature. See, for example, B. M. Das, Advanced Soil Mechanics, Hemisphere Pr. 1997, pp. 315-317 or S. Aranson & L. S. Tsimring in The Physics of Granular Media, H. Hinrichsen & D. Wolf, eds, Wiley-VCH, (2004) pp. 146-147, incorporated herein by reference in their entireties.

Figure 3:
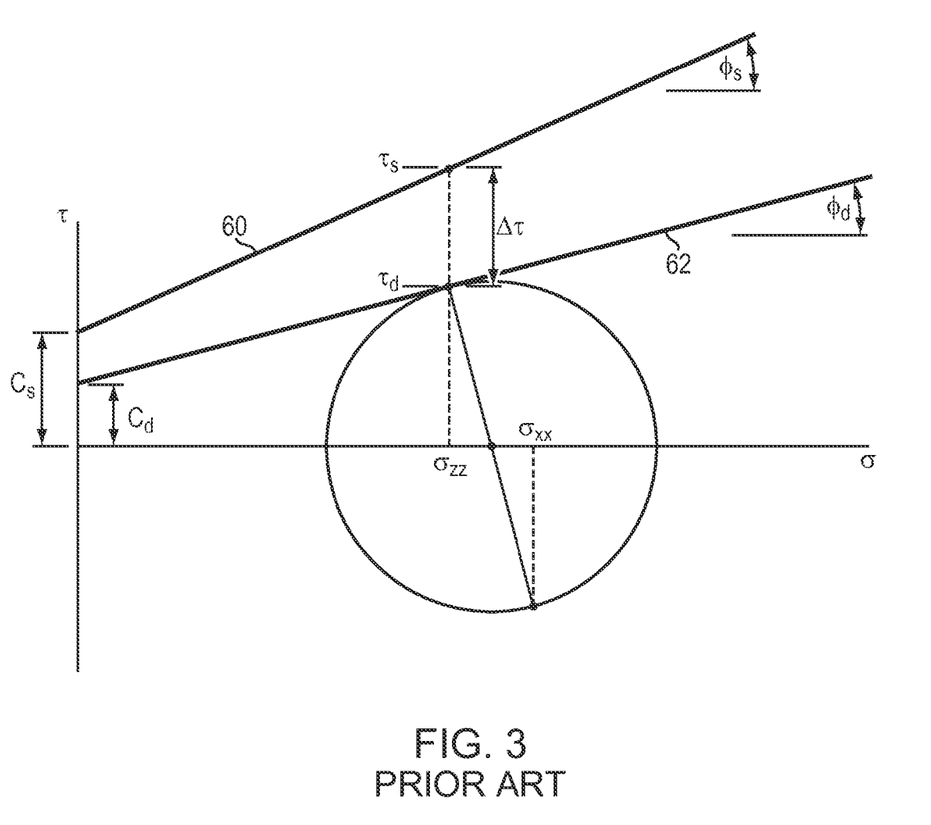
FIG. 3 is a graph illustrating the forces acting on a particle during three dimensional printing, with a difference in shear strength between the static values (static yield locus 60) and dynamic values (dynamic yield locus 62) with normal stress $\sigma_{zz}$ denoted by $\Delta\tau$.

A force balance on the feature shown in FIG. 3 (FIG. 6 in Giller) leads to the equation:

$$L[c_s - c_d + \sigma_{zz}(\tan \varphi_s - \tan \varphi_d)] = L\Delta\tau > t\sigma_{XX} \quad (1)$$

for the feature to remain in place. The normal stress against the bottom surface of the feature is assumed the same as that against the top surface. The difference in shear strength between the static values (static yield locus 60) and dynamic values (dynamic yield locus 62) with normal stress $\sigma_{zz}$ is denoted by $\Delta\tau$.

"Bredt flow parameter" (Br) is herein defined, expressing, in general, the propensity for printed features to shift in the build area of a three dimensional printer during spreading of build material:

$$\Delta\tau_{xx}/\sigma_{xx} = Br > t/L \approx 0.1 \quad (2)$$

The ratio t/L is slightly arbitrary. One may assume for practical purposes that features with a length at least several times the layer thickness (L≈10 times t) are those that are preferably considered in this model. Layers with thickness of 100 micrometers are standard in three dimensional printing machines that are currently available, and instability of isolated patches smaller than 1.0 mm may have a minimally discernable effect on the appearance of a model.

For the flow conditions most useful for three dimensional printing, the build material is non-cohesive, i.e., the cohesion of the granular material is much less than the dynamic pressure of material in flow. Using reasonable values for the bulk density of the build material and spreading speed in a standard ZPrinter®310 three dimensional printer, one obtains an order of magnitude estimate:

$$c_s \approx c_d << \rho(u + \omega a)^2 \approx 600 \text{ Pa} \quad (3)$$

A material having shear strength of this magnitude is a weak gel such as yogurt. While it is not strong in any sense of the word, it is by no means free-flowing. As an additional estimate of the lower bound of the cohesion, we may observe that the bead of free-flowing particulate build material may be in a state of yielding at the bottom of the pile when the counter-roller begins to move it across the build area. In a ZPrinter®310 three dimensional printer, the bead is approximately 1 cm tall. Accordingly, the following inequality holds:

$$c_s \approx c_d << \rho g h \approx 100 \text{ Pa} \qquad (4)$$

This is typically a minimum acceptable range for cohesion in a particulate build material for it to be considered free-flowing. While the compressive and shear stress imposed on the build material through the motion of the counter-roller may have a magnitude approximately 600 Pa, the cohesion is preferably accordingly less than 100 Pa in order for it not to adversely affect the layering of build material.

With the assumption that the cohesion is negligibly small, the following simplification can be made $$(\tan \varphi_s - \tan \varphi_d) > \tau \sigma_{xx}/L\sigma_{zz} \qquad (5)$$

and $$\sigma_{xx}/\sigma_{zz} = (1+\sin \varphi_d)/(1-\sin \varphi_d) \qquad (6)$$

This leads to an equation $$(\tan \varphi_s - \tan \varphi_d) \times [(1-\sin \varphi_d)/(1+\sin \varphi_d)] = Br_{nc} > 0.1 \qquad (7)$$

Equation 7 expresses a vitally important feature of free-flowing particulate build materials that are suitable for use in three dimensional printing machines. The quantity on the left is termed the "Bredt flow parameter for noncohesive particulate materials," and it preferably has a value greater than about 1/10 for small printed features to remain stationary during spreading.

Measurement of Static and Dynamic Friction Coefficients

Methods exist for measuring the static yield properties of granular materials in shear. See, for example, B. M. Das, Advanced Soil Mechanics, Hemisphere Pr. 1997, pp 313-326, incorporated herein by reference in its entirety. It is found, however, that the values for the yield parameters $\varphi$ and c vary with experimental conditions, and it is necessary to measure the properties in stress range of interest.

An example of a piece of laboratory equipment that is capable of measuring the static friction characteristics of particulate materials is the "ShearScan TS12" manufactured by Sci-Tec Inc. This device holds a sample of material in a cylindrical cell and applies a vertical load to the material to consolidate it to a specified level. The device then applies a gradually increasing transverse shearing force until it detects slip in the sample of material. It performs this measurement across a range of applied loads to develop a yield locus analogous to those pictured in FIG. 1. Since the instrument measures the shear stress at the instant of rupture, this is the static friction in the particulate material.

One difficulty in this analysis with the ShearScan instrument is that it is designed to measure the frictional characteristics of particulate materials in large silos when they are subjected to stress levels much larger than that found in the spreading system of a 3D Printer. The stress was estimated in equation (3) above to be on the order of ½ kPa, about 1/10 the stress levels in the operating range of the ShearScan.

Furthermore, there does not exist an analogous instrument to measure the "dynamic" friction characteristics of particulate materials. Several instruments called "powder rheometers" exist, for example the FT4 Powder Rheometer manufactured by Freeman Technology. This device does not strictly measure a yield locus, however. It measures the rate of working of a particulate material in a specialized mixing cell where the stresses in the sample are not known. It is therefore not suitable for use in this model.

An approximate laboratory procedure may provide estimates of the flow parameter for non-cohesive particulate build materials. This is done by measuring the angle of repose of a pile of a particulate material under static and dynamic conditions. The procedure is accomplished as follows. On a metal sheet, a conical pile is formed from a particulate material sample by sprinkling particles very slowly over one point from a height of about 1 cm above the growing top of the pile. The diameter d and height h of the pile are measured. The ratio d/2 h is an approximate measure of the static friction coefficient $\tan \varphi_s$. Next, a small piece of metal, such as a screwdriver, is used to tap lightly on the plate so the pile collapses. The height and diameter are measured again, and the ratio d/2 h is an approximate measure of the dynamic friction coefficient $\tan \varphi_d$.

The height of the pile is chosen such that $$gh \approx (u+\omega a)^2$$

This ensures that the stress at the bottom of the heap is in approximately the right range. For ordinary 3D Printers formerly manufactured by ZCorp, this height is roughly 5 cm. It is necessary to tap the plate relatively lightly so that the motion of the pile after the tapping is primarily driven by gravity, and not by kinetic energy from the tapping motion. One or two light taps may be sufficient.

Powder Components

Powders in accordance with embodiments of the invention include two-component (acid-base) cement and a non-reactive ceramic filler. Accordingly, the powder may include a soluble adhesive, magnesium oxide, an acid additive, and a nonreactive ceramic filler. An exemplary composition is 10% cement-grade MgO; 5% citric acid (80 mesh); 20% maltodextrin; and balance mullite (200 mesh).

Adhesive

One of the concerns in this industry (and many others) is the environmental impact of the waste products from the process. For this reason, the adhesives of greatest interest are those derived from starch and cellulose, which are soluble in water and propylene glycol, and are biodegradable. A preferred adhesive is maltodextrin, which is nontoxic and biodegradable, and it develops a strong adhesive bond in propylene glycol. Hydrolyzed starch or hydroxypropyl cellulose may also be used to form an adhesive in propylene glycol.

The organic, polymeric adhesive components in the instant invention typically dissolve to form very viscous solutions that migrate very slowly, if at all, through the pore space of the powder. Accordingly, the adhesive component should have a grain size less than or equal to the grain size of the primary (filler) component of the mixture. A size of roughly 20 μm is most preferred, with a range from 5 μm up to 100 μm depending on the coarseness of the ceramic filler.

The quantity used is preferably a minimum to bond the article together. When the ceramic article is heat-treated in a kiln, this adhesive burns away leaving additional porosity. In most cases it is desirable to make ceramic articles as densely as possible. A range of 1% to 30% has been found to be effective for various applications, though it is found that a range of 10%-20% is most preferred.

Cement Filler—MgO, Acid Additive

A cementitious material is incorporated into the powder system to promote dimensional stability during the time the soluble adhesive is curing or drying, and to provide structure during firing of a ceramic, e.g., in a kiln. This material reacts in the presence of the jetting fluid to form a solid network in the printed material, preventing rearrangement of the grains during drying, and strengthening the structure. Organic adhesive burns off at a temperature well below the normal firing temperature for ceramics, and some structure is required through the temperature range up to the point where the ceramic filler will sinter. This may be provided by a small amount (approximately 10% by weight) of magnesium oxide cement (MgO) in combination with an acid additive.

There exists a family of cements based on magnesium oxide (MgO) including magnesium oxysulfate, magnesium oxychloride, and magnesium phosphate. See, e.g., Acid-Base Cements by A. D. Wilson and J. W. Nicholson, Cambridge University Press, *Chemistry of Solid State Materials Series*, Vol. 3, 1993, ISBN 0 521 37222 4, incorporated herein by reference in its entirety. Commercial cement-grade magnesium oxide is available, for example, from Premier Chemicals, Inc. It has been found that organic acids such as citric acid, succinic acid, malic acid, and fumaric acid all react rapidly with MgO to form a solid structure within the body of 3D printed material. These materials, as solid powders, can be added to the cement mixture. Other acids that come in powder form that may be suited for this application include tartaric acid, ascorbic acid, adipic acid, sulfamic acid, oxalic acid, malonic acid, maleic acid, gluconic acid, benzoic acid, phthalic acid, and itaconic acid. Acid anhydrides such as succinic anhydride, maleic anhydride, and phthalic anhydride may also be used to react with MgO.

For cement-grade MgO, the grain size as supplied is quite fine, typically 20 μm and smaller. The rate of reaction may be adjusted by selection of the grain size of the acid component. As discussed above, it may be desirable for the jetting fluid to become imbibed into the pore space of the powder prior to substantial solidification. For this reason, the acid component is chosen with a relatively coarse grain size. The effect is to create a distribution of grains that are separated by a distance through which the reactive components diffuse after they dissolve. An upper bound to the grain size coincides approximately with the thickness of the spread layers. For a layer thickness of 200 μm, the corresponding mesh size is approximately 80. If a higher rate of solidification is desired, reducing the diameter of the grains until they are the same as that of the MgO, about 20 μm (coinciding with a 625 mesh screen.)

The composition of cement that promotes good structure formation has been found to be in the range of 5%-15% MgO, and 3%-10% of acid additive, by weight.

Ceramic

The balance of the powder composition is a ceramic material of commercial significance. The sintered product contains predominantly this material after kiln treatment. Examples of suitable ceramic fillers include (but are not limited to) porcelain and porcelain precursors; refractories such as mullite, olivine or foundry sand; abrasives such as aluminum oxide; glass powder, and glass-forming minerals such as silica mixed with feldspar or sodium silicate and calcium oxide. Certain specialized materials may also be used: for example, kieserite, or magnesium sulfate monohydrate, may be incorporated to make a water-soluble refractory for cores in metal castings.

The grain size of the ceramic filler is selected on the basis of the performance of the desired product. For example, if fine china is desired, one would select a grade of powder with a fine grain size, consistent with that product in traditional manufacture. Alternatively, if a porous insulating piece of kiln furniture is desired, then a fairly coarse, sandy grit may be preferred. Embodiments of the instant invention enable building 3D printed articles from a wide variety of ceramic substances. To be most consistent with the mechanical constraints of the available printing hardware, it has been found that the grain size of roughly 50-100 μm is most preferred, with a wider range of 20 μm to 300 μm being within acceptable limits.

The products of these cementation reactions break down their structure in the presence of acid, and they decompose on heating. They may not be suitable for construction purposes or other uses normally associated with cement, but they are eminently suitable for 3D printing. While a 3D printed part is curing, the solid material provides a rigid structure to maintain accuracy of the product until full strength is developed within the soluble adhesive. After the part is fully cured, the product of the acid-base reaction between MgO and the acid additive provides some rigidity while the green ceramic part is loaded into a kiln, and subsequently the organic component burns off during firing.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A powder for three-dimensional printing, comprising: a mixture of:
   a soluble adhesive;
   a cement filler comprising magnesium oxide and an acid additive, wherein the acid additive is fumaric acid, and
   a nonreactive ceramic filler.

2. The powder of claim 1, wherein the soluble adhesive is selected from the group consisting of compounds derived from starch and compounds derived from cellulose.

3. The powder of claim 2, wherein the soluble adhesive is selected from the group consisting of maltodextrin, hydrolyzed starch, and hydroxypropyl cellulose.

4. The powder of claim 2, wherein the cement filler has a grain size of less than 200 μm.

5. The powder of claim 1, wherein the nonreactive ceramic filler is selected from the group consisting of porcelain, porcelain precursors, refractory materials, abrasive materials, kieserite, and magnesium sulfate monohydrate.

6. The powder of claim 1, wherein the nonreactive ceramic filler comprises a grain size of less than 300 microns.

7. The powder of claim 1, wherein the mixture comprises <1 wt % of liquid additives.

8. A kit, suitable for three-dimensional printing, comprising:
   a. a substantially nonaqueous liquid jetting fluid comprising less than 50% water by weight and at least 50% propylene glycol by weight and
   b. a solid powder mixture comprising a soluble adhesive, magnesium oxide, an acid additive, and a nonreactive ceramic filler, wherein the acid additive is selected from the group consisting of lactic acid, acetic acid, fumaric acid, ascorbic acid, adipic acid, sulfamic acid, oxalic acid, butyric acid, malonic acid, maleic acid, gluconic acid, benzoic acid, propanoic acid, phthalic acid, itaconic acid, succinic anhydride, acetic anhydride, maleic anhydride, phthalic anhydride, propanoic anhydride, monosodium glutamate, monosodium citrate, monosodium tartarate, g-butyrolactone, and d-gluconolactone.

9. The kit of claim 8, wherein the jetting fluid comprises up to 50 wt % cosolvents including at least one material selected from the group consisting of water, glycerin, an alcohol, an ester, and a glycol ether.

10. The kit of claim 9, wherein the alcohol is selected from the group consisting of denatured alcohol, isopropyl alcohol, methyl alcohol, and ethyl alcohol.

11. The kit of claim 9, wherein the ester is selected from the group consisting of ethyl acetate, ethyl butyrate, dimethyl succinate, propylene glycol diacetate, and triethyl citrate.

12. The kit of claim 9, wherein the glycol ether is selected from the group consisting of 2-ethoxyethanol, 2-butoxy-ethoxy-ethanol, dipropylene glycol monomethyl ether, and diethylene glycol monomethyl ether acetate.

13. The kit of claim 8, wherein the jetting fluid comprises an acidic additive selected from the group consisting of lactic acid, acetic acid, ascorbic acid, adipic acid, sulfamic acid, oxalic acid, butyric acid, malonic acid, maleic acid, gluconic acid, benzoic acid, propanoic acid, phthalic acid, itaconic acid, succinic anhydride, acetic anhydride, maleic anhydride, phthalic anhydride, propanoic anhydride, monosodium glutamate, monosodium citrate, monosodium tartrate, g-butyrolactone and d-gluconolactone.

14. The kit of claim 8, wherein the nonreactive ceramic filler is selected from the group consisting of porcelain and porcelain precursors, refractories, abrasives, glass powder, and glass-forming minerals, kieserite, and magnesium sulfate monohydrate.

15. A method for forming a three dimensional article, comprising the steps of:
preparing a green ceramic body comprising organic compounds by performing the steps of:
(a) providing a layer of a powder mixture, said powder mixture comprising a soluble adhesive, magnesium oxide, an acid additive, and a nonreactive ceramic filler; and
(b) applying a substantially nonaqueous liquid jetting fluid comprising less than 50 wt % water by weight to at least a portion of the powder mixture layer; and
heat treating the green ceramic body, thereby burning off or otherwise volatilizing the organic compounds.

16. The method of claim 15, wherein the acid additive is selected from the group consisting of lactic acid, acetic acid, fumaric acid, ascorbic acid, adipic acid, sulfamic acid, oxalic acid, butyric acid, malonic acid, maleic acid, gluconic acid, benzoic acid, propanoic acid, phthalic acid, itaconic acid, succinic anhydride, acetic anhydride, maleic anhydride, and phthalic anhydride, propanoic anhydride, monosodium glutamate, monosodium citrate, monosodium tartarate, g-butyrolactone, and d-gluconolactone.

17. The method of claim 16, wherein the acid additive is fumaric acid.

18. A kit, suitable for three-dimensional printing, comprising:
a. a substantially nonaqueous liquid jetting fluid comprising less than 50% water by weight and
b. a solid powder mixture comprising a soluble adhesive, magnesium oxide, an acid additive, and a nonreactive ceramic filler, wherein the acid additive is fumaric acid.

* * * * *